United States Patent
Arthurs (10) Patent No.: US 10,582,699 B1
(45) Date of Patent: Mar. 10, 2020

(54) ANIMAL URINE AND SPECIMEN COLLECTION DEVICE

(71) Applicant: Jacqueline A. Arthurs, Clermont, FL (US)

(72) Inventor: Jacqueline A. Arthurs, Clermont, FL (US)

( * ) Notice: Subject to any disclaimer, the term of this patent is extended or adjusted under 35 U.S.C. 154(b) by 237 days.

(21) Appl. No.: 15/359,483

(22) Filed: Nov. 22, 2016

(51) Int. Cl.
*A01K 23/00* (2006.01)

(52) U.S. Cl.
CPC .................................. *A01K 23/00* (2013.01)

(58) Field of Classification Search
CPC ...................................................... A01K 23/00
See application file for complete search history.

(56) References Cited

U.S. PATENT DOCUMENTS

| | | | |
|---|---|---|---|
| 2,160,473 A | | 5/1939 | Dunn |
| 2,310,505 A | * | 2/1943 | Blackburn ............... A61F 5/453 119/869 |
| 3,090,356 A | | 5/1963 | Andrisani |
| 3,405,714 A | * | 10/1968 | Moss ...................... A61F 5/453 604/350 |
| 3,559,651 A | * | 2/1971 | Moss ...................... A61F 5/453 604/349 |
| 3,792,687 A | | 2/1974 | Ehrman |
| 4,103,645 A | | 8/1978 | Tyler |
| 4,510,887 A | | 4/1985 | Lincoln et al. |
| 4,779,573 A | | 10/1988 | Vidal |
| 5,738,047 A | * | 4/1998 | McNamara ............ A01K 23/00 119/869 |
| 5,787,843 A | | 8/1998 | Chao |
| 5,937,795 A | | 8/1999 | Raphael |
| 6,709,409 B2 | | 3/2004 | Vella |
| 7,018,366 B2 | * | 3/2006 | Easter ..................... A61F 5/451 604/327 |
| 7,128,352 B1 | | 10/2006 | Phippen |
| 7,214,199 B1 | | 5/2007 | Yastrebov |
| 7,287,489 B1 | * | 10/2007 | O'Brien ................. A01K 15/02 119/712 |

(Continued)

FOREIGN PATENT DOCUMENTS

| CN | 1492733 A | 4/2004 |
|---|---|---|
| CN | 201378119 Y | 1/2009 |

(Continued)

*Primary Examiner* — Kristen Matter
(74) *Attorney, Agent, or Firm* — Terry M. Sanks, Esq.; Beusse Wolter Sanks & Maire, PLLC (57) ABSTRACT

An animal urine/specimen collection device for home or clinic that allows easy, prolonged use and is leak resistant. A disposable urine collection device and marking deterrent for use by pet owners and veterinarians on animals such as dogs is disclosed. The urine collection device of the present invention is formed from one pouch of flexible plastic material formed into a valve opening at the bottom, being inserted into another pouch of plastic flexible material with no valve formed at the bottom, creating an encapsulating container for liquid that passes through the inner valve pouch due to the outer and inner (valve shaped) pouch layers being sealed at the top peripheral edges. Flexible supporters that are integrally formed to the collection device are drawn up to secure on the back near the hind quarters for male animals, and around the legs and thighs, then on the back for female animals.

14 Claims, 6 Drawing Sheets

(56) References Cited

U.S. PATENT DOCUMENTS

| | | | |
|---|---|---|---|
| 7,762,596 B1 | 7/2010 | Gaydos | |
| 7,778,568 B2 | 8/2010 | Scott | |
| 2008/0190381 A1* | 8/2008 | Stampe | A61D 9/00 |
| | | | 119/850 |
| 2009/0187154 A1* | 7/2009 | Waller | A61F 5/451 |
| | | | 604/347 |
| 2010/0030169 A1* | 2/2010 | Dauterman | A61F 5/4405 |
| | | | 604/328 |
| 2013/0237964 A1* | 9/2013 | Kicos | A61F 5/4408 |
| | | | 604/544 |
| 2015/0257362 A1* | 9/2015 | Smith | A01K 13/006 |
| | | | 119/821 |

FOREIGN PATENT DOCUMENTS

| | | |
|---|---|---|
| CN | 1833489 B | 4/2010 |
| CN | 201767991 U | 3/2011 |

* cited by examiner

ANIMAL URINE AND SPECIMEN COLLECTION DEVICE

CROSS-REFERENCE TO RELATED APPLICATION

Provisional application No. 62/386,298, filed 2015 Nov. 25 by the present inventor

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISITION COMPACT DISK APPENDIX

Not Applicable

| Background- Prior Art | | | |
|---|---|---|---|
| 2,160,473 | 5/1939 | Dunn | 119/868 |
| 3,090,356 | 5/1963 | Andrisani | 119/868 |
| 3,792,687 | 2/1974 | Ehrman | 119/868 |
| 4,103,645 | 8/1978 | Tyler | 119/868 |
| 4,510,887 | 4/1885 | Lincoln et al. | 119/868 |
| 4,779,573 | 12/1986 | Vidal | 119/95 |
| 5,787,843 | 8/1998 | Chao | 119/869 |
| 5,937,795 | 11/1997 | Raphael | 119/869; 119/868 |

BACKGROUND OF INVENTION

This invention relates to animal waste/specimen product collection devices and, more particularly, to a urine/specimen collection device for domestic animals plus a possible solution to urine marking by animals such as dogs.

Historically, collection devices for animal specimens typically include a harness having flexible straps which are adapted for attachment to the hind quarters of the animal and a collection bag or tray detachably connected to the harness. Such a harness usually includes a waist band and leg bands attached thereto which are adapted to completely encircle the respective parts of the animal.

Examples of such a waste collection product devices are disclosed by U.S. Pat. No. 3,090,356 to Andrisani, and U.S. Pat. No. 4,444,152 to Berardo. These patents disclose an animal toilet garment consisting of an adjustable harness whereon detachable collection bags are installed for the collection of urine and fecal matter.

There are also devices dedicated just to the collection of animal urine. These devices involve harnesses, and bags that are designed only for urine collection and involve removable, unsealed collection bags that would not be conductive to long term wear as disclosed by U.S. Pat. No. 2,160,473 to Dunn and U.S. Pat. No. 5,787,843 to Chao.

Another type of collection device not necessarily for specimen collection, but for removal of fecal and urine matter involving a cloth apparatus as disclosed by U.S. Pat. No. 4,527,991 to Msarsa and U.S. Pat. No. 4,510,887 to Lincoln et al. These devices involve harnesses as well, but the excrement goes into cloth or bag attachments. The cloth apparatus may be removed and washed.

The above mentioned animal waste/specimen product collection devices are difficult for the owner or clinic to adjust and install as well as being uncomfortable and cumbersome for the animal. Removal of the detachable collection bag is an unpleasant task for the pet owner or clinic. Prolonged use of such animal waste collection devices was not an option as these devices could easily leak as the animal moved about throughout a given time period. Cloth devices tend to become saturated with excrement, causing irritation to the skin of the animal.

SUMMARY OF INVENTION

The present invention is comprised of a double walled pouch, open at the top to allow fitting over a penis or vulva, but having the inner and outer layers sealed to each other at the top, with the interior pouch being formed into a valve at the bottom. The inner valve shaped bottom pouch fits into the outer cylinder shaped pouch. The seal between the layers towards the top of the pouch and the valve at the bottom of the inner pouch restrict the flow of fluid out of the device. The device is attached to the animal using flexible adhesive straps/supporters. The present invention has been developed to provide a leak resistant (via valve) application for home use to possibly prevent dog marking, inside urination, as well as simplifying veterinary specimen collection. The device is easily reattached or reused if not soiled, easy to remove, and completely disposable if soiled. The urine contained within the walls of the double layered device is easily extracted by syringe for testing. Thus the present invention has been developed to provide an easily attachable/detachable, completely disposable, leak resistant urine/specimen collection device for small animals such as dogs to solve the above problems and other shortcomings of the prior art.

DETAILED DESCRIPTION OF THE INVENTION

Figure 1:
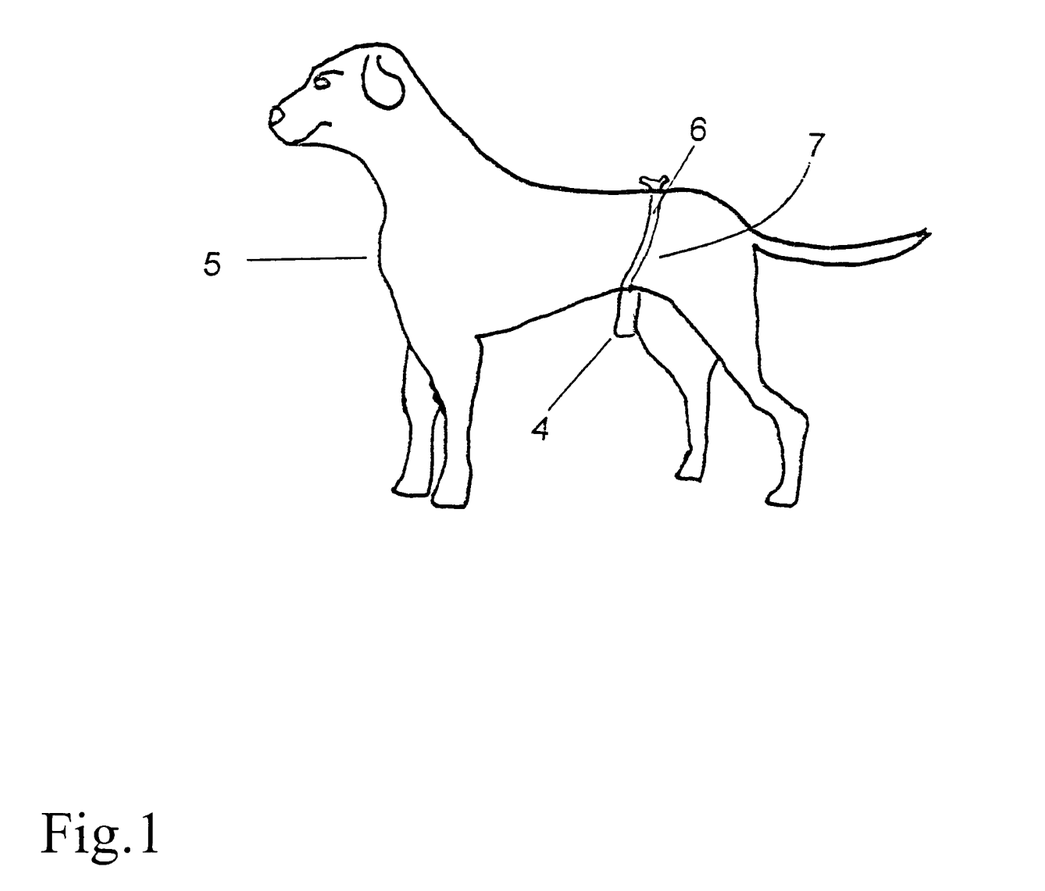
FIG. 1 is a side view of the functional position of the animal urine/specimen collection device of the present invention for male animals.

With reference to the drawings, there is shown therein an improved animal urine/specimen collection device for MALE animals in accordance with the present invention, indicated generally at 7 and illustrated in FIG. 1. The urine/specimen collection device 4 is shown installed in its functional position about the hind quarters 7 of a male dog 5 in FIG. 1, and is an example of a device using four inch long cylinders or pouches.

Figure 2:
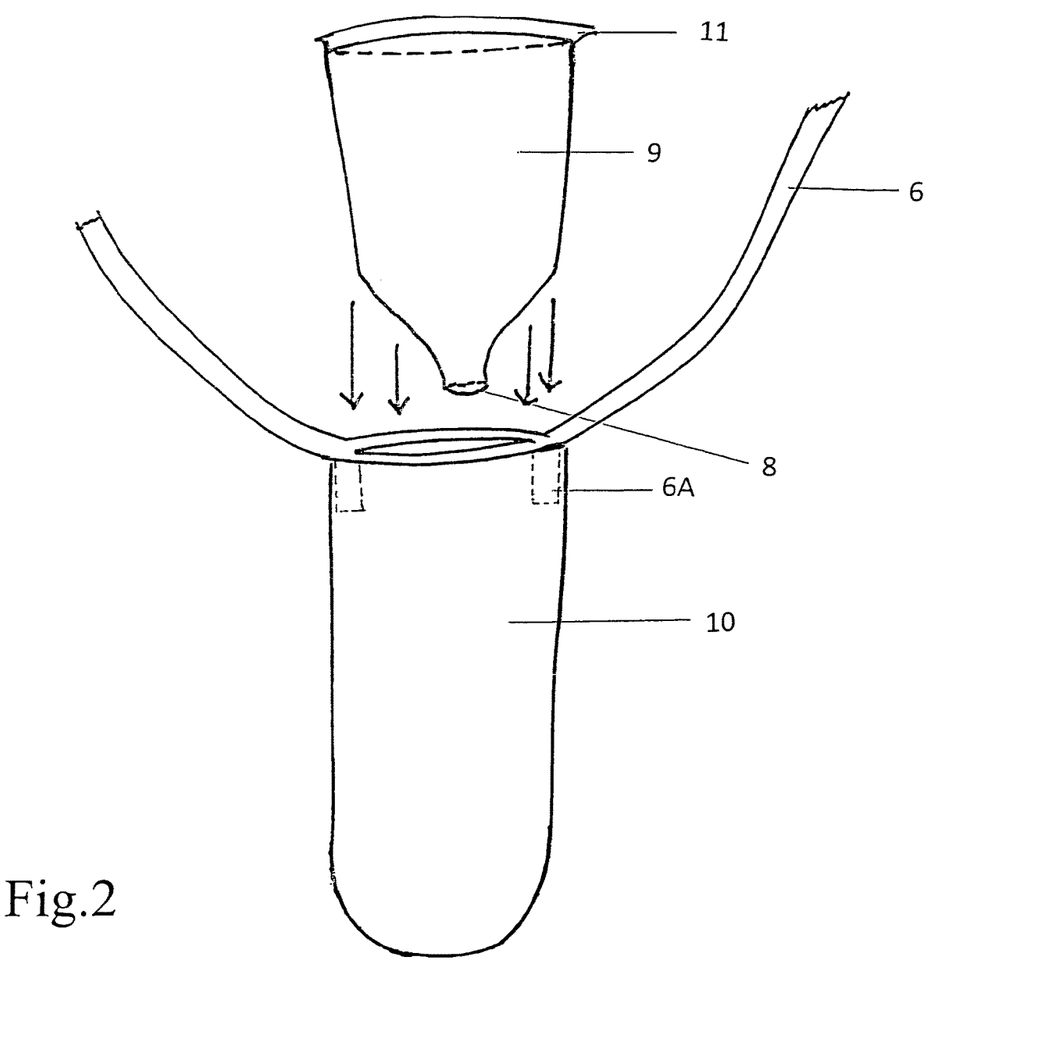
FIG. 2 is a view of the expanded parts for the animal urine/specimen collection device demonstrating assembly of the device of the present invention for male animals.

The urine/specimen collection device 4 in FIG. 1 hereafter referred to as the "Device" includes an inner, smaller shaped cylinder or pouch 9 formed to a valve opening 8 in FIG. 2 inside a larger, cylinder collection bag or pouch 10 in FIG.

2 which is integrally formed with two flexible supporters 6 in FIG. 2, indicated generally at 7 in FIG. 1 that is secured about the abdomen of the dog 5 in FIG. 1.

Figure 3:
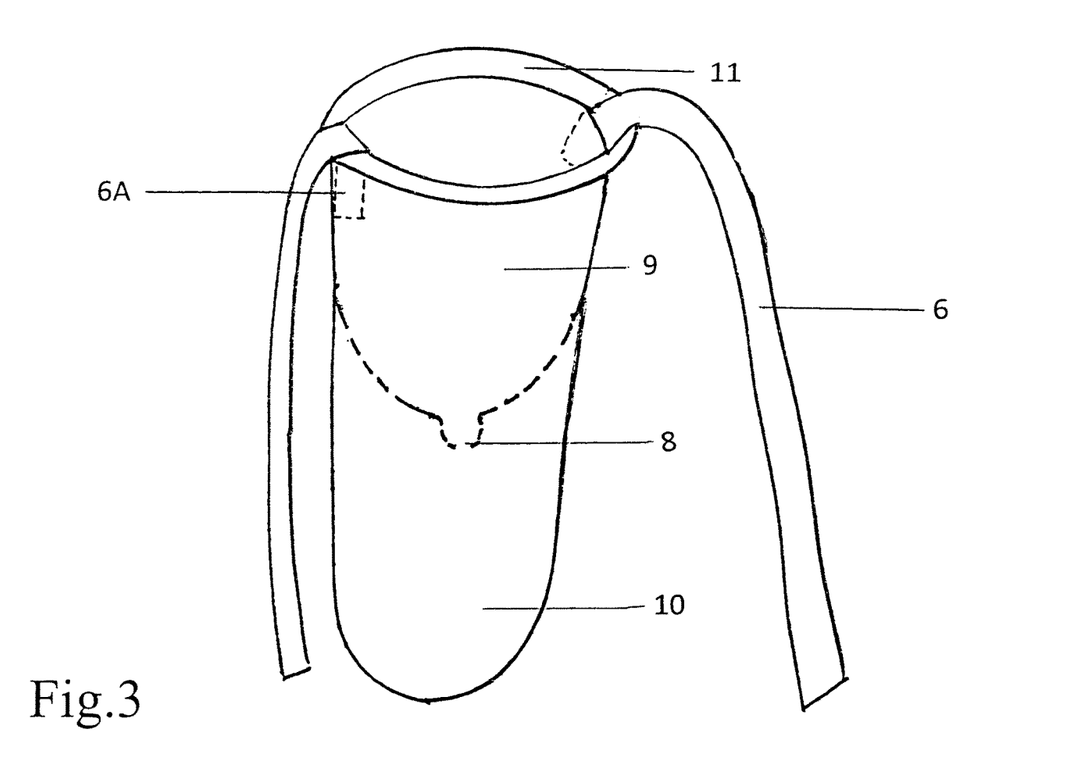
FIG. 3 is a side view of the animal urine/specimen collection device of the present invention for male animals.

The Device, FIG. 2 is formed from one cylinder or pouch of flexible plastic material or other suitable material 9 in FIG. 2 and FIG. 3 in varying lengths and volumes open on the top end and formed into a valve 8 in FIG. 2 and FIG. 3 with a small opening at the bottom end being inserted into another, longer cylinder or pouch of flexible plastic material or other suitable material 10 in FIG. 2 and FIG. 3 and both layers sealed together at the peripheral edges 11 in FIG. 2 and FIG. 3 at the top as to retain urine/specimen in a sanitary manner before or after the flexible supporters are attached. Collection cylinder or pouch valve 8 in FIG. 2 and FIG. 3 functions as a preventative measure for decreased risk of backflow or leaks, allowing for prolonged home or veterinary clinic use. FIG. 1 Device 4, as well as flexible supporters 6 are coated with a non-toxic, unpleasant tasting substance to deter chewing.

The flexible supporters 6 in FIG. 2 and FIG. 3 are self-adhesive bandage material approximately 0.5 inch wide and approximately 10 inches long up to needed length to encompass animal's abdomen and may be attached on opposite sides of the rim opening of the device between the two plastic cylinders or pouches while being sealed, or attached on opposite sides of the rim of the device opening via other methods after sealing.

In the normal use of the urine/specimen collection device 4 FIG. 1, the same is positioned over the penis of the animal 5. Once the device 4 is in the appropriate position, the flexible supporters 6 are drawn upwardly around the abdomen to secure the collection cylinder or pouch device 4 in position and simply tied about the animal's lower back to support the collection cylinder or pouch device 4.

Figure 1A:
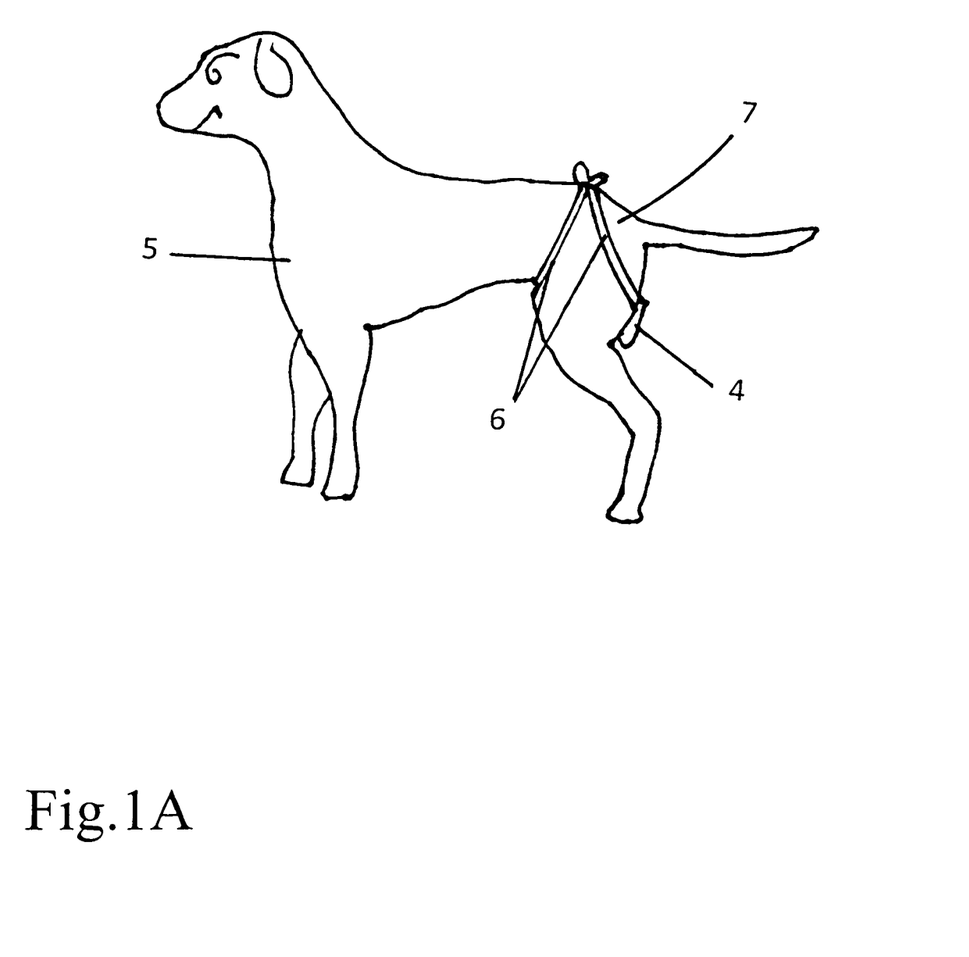
FIG. 1A is a side view of the functional position of the animal urine/specimen collection device of the present invention for female animals.

With reference to the drawings, there is shown therein an improved animal urine/specimen collection device for FEMALE animals in accordance with the present invention, indicated generally at 7 and illustrated in FIG. 1A. The urine/specimen collection device 4 is shown installed in its functional position about the hind quarters 7 of a female dog 5 in FIG. 1A, and is an example of a device using four inch long cylinders or pouches.

Figure 2A:
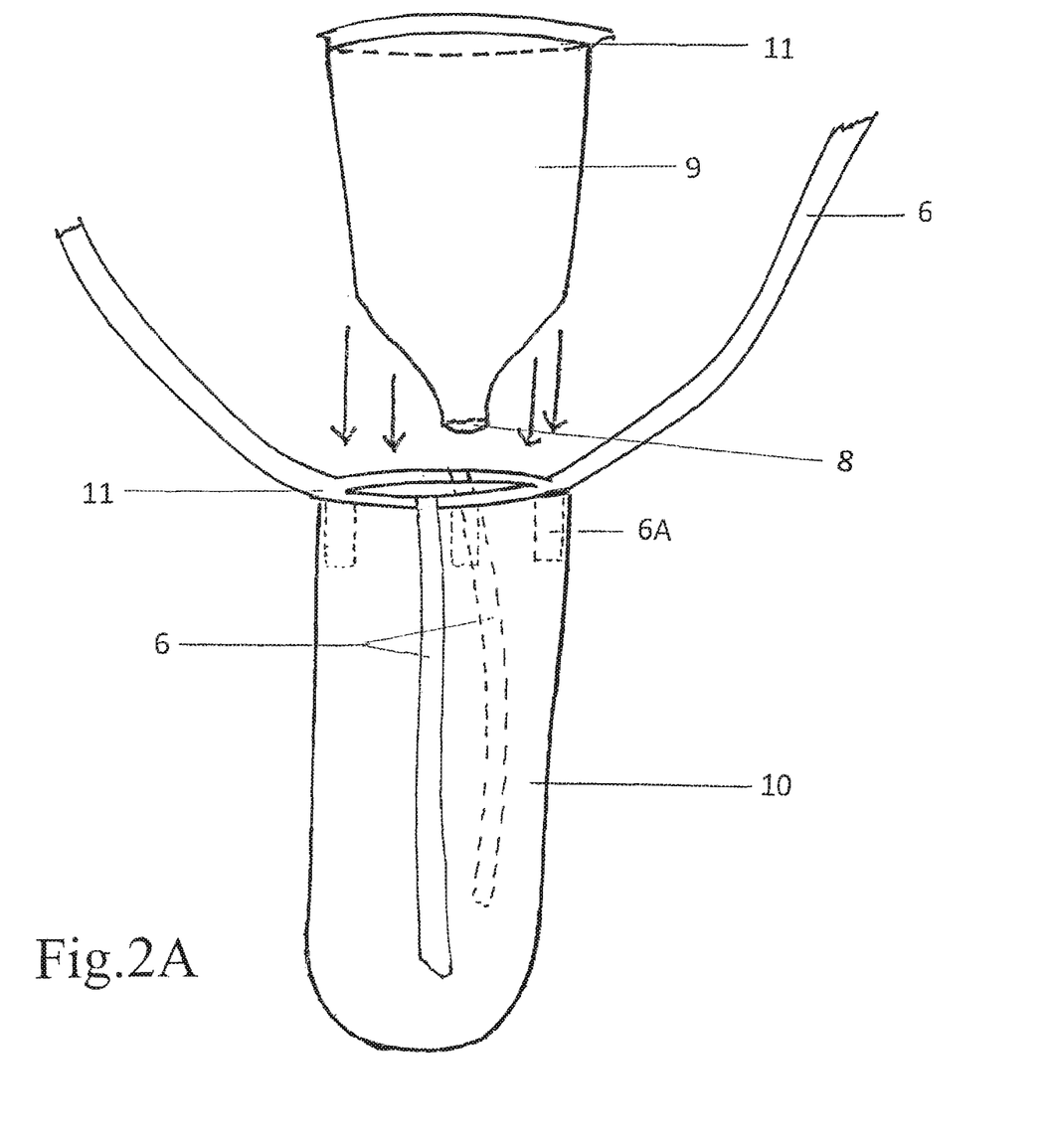
FIG. 2A is a view of the expanded parts for the animal urine/specimen collection device demonstrating assembly of the device of the present invention for female animals.

The urine/specimen collection device 4 in FIG. 1A hereafter referred to as the "Device" includes an inner, smaller shaped cylinder or pouch 9 formed to a valve opening 9 in FIG. 2A inside a larger, cylinder collection bag or pouch 10 in FIG. 2A which is integrally formed with 4 flexible supporters 6 in FIG. 2A, indicated generally at 7 FIG. 1A that is secured about the leg and thigh of the female dog 5 in FIG. 1A.

Figure 3A:
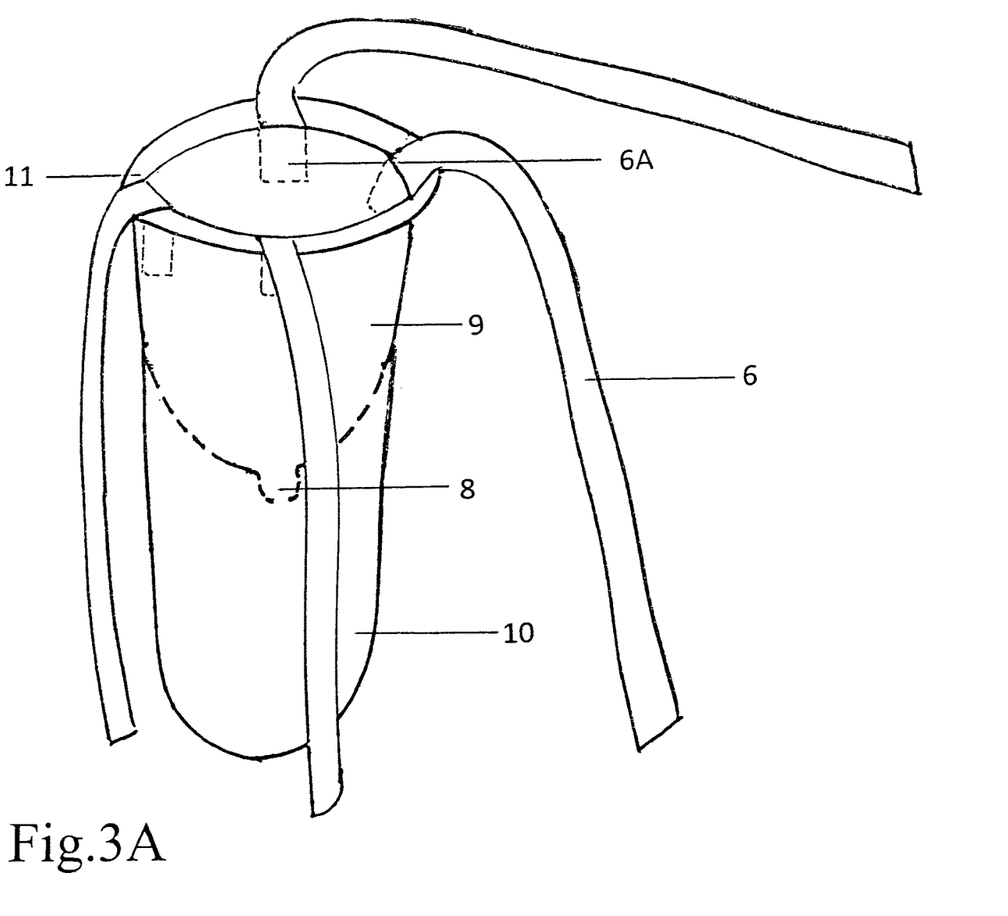
FIG. 3A is a side view of the animal urine/specimen collection device of the present invention for female animals

The Device, FIG. 2A is formed from one cylinder or pouch of flexible plastic material or other suitable material 9 in FIG. 2A and FIG. 3A in varying lengths and volumes open on the top end and formed into a valve 8 in FIG. 2A and FIG. 3A with a small opening at the bottom end being inserted into another, longer cylinder or pouch of flexible plastic material or other suitable material 10 in FIG. 2A and FIG. 3A and sealed near the top peripheral edges 11 in FIG. 2A and FIG. 3A as to retain urine/specimen in a sanitary manner before or after the flexible supporters are attached. Collection cylinder or pouch valve 8 in FIG. 2A and FIG. 3A functions as a preventative measure for decreased risk of backflow or leaks, allowing for prolonged home or veterinary clinic use.

FIG. 1A Device 4, as well as flexible supporters 6 are coated with a non-toxic, unpleasant tasting substance to deter chewing.

The flexible supporters 6 are self-adhesive bandage material approximately 0.5 inch wide and approximately 10 inches long up to needed length to encompass animal's leg and thigh having two flexible supporters each attached on opposite sides of the rim opening of the device between the two plastic cylinders or pouches while being sealed, or attached on opposite sides of the rim of the device opening via other methods after sealing.

In the normal use of the urine/specimen collection device 4, the same is positioned over the vulva of the animal 5. Once the device 4 is in the appropriate position, the flexible supporters 6 are drawn upwardly around the leg and thigh to secure the collection cylinder or pouch device 4 in position and simply tied about the animal's lower back to support the collection cylinder or pouch device 4.

In an alternate embodiments of the device, the materials of the collection device may be other colors. Transparent materials are recommended. The opening of the device which presses against the animal's body, may be pre-formed to follow the contour of the animal body. Different materials, volumes, sizes and interconnections can be used on all components. Different methods of joining/sealing inside cylinder to outside cylinder at the top edge may be used. Different methods of forming valve and attaching flexible supporters may be used. Valve feature may be a different shape and size opening.

The advantages of the present invention include, without limitation, the ease with which the device is attached and detached, especially for those with limited manual dexterity. Self-adhesive bandage material allows for ease of attachment and detachment as no tying is needed, just a few quick twists secure the device or detach the device. If soiled, the device may be quickly removed by cutting the flexible supporters with knife or scissors. The self-adhesive material used to make the flexible support straps also adheres well to the fur of the animal reducing slippage. The flexible supporter may also be cut for removal of the device. The whole device is flexible and is coated with a spray that is safe and deters chewing. Current devices to stop animal marking, can cause chaffing along the hind quarters of the animal as no matter how frequently you change the "wrap" or the liner, urine frequently soaks its way up the material and the urine soaked elastic band and can cause irritation and chaffing.

The whole device is disposable if soiled, and reusable if not soiled. Animals may be left unsupervised while wearing the device as the design of the collection pouch valve creates the leak resistant function of the device allowing for animals to wander around homes and on furniture for short periods with little concern for environmental damage. Urine is easily visible in the pouch allowing for timely disposal. As animals try unsuccessfully to urinate in specific spots, the existing scent dissipates, possibly decreasing future attempts.

While the forgoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method, and examples, but by all embodiments and methods within the scope and spirit of the invention.

What is claimed is:

1. A disposable urine collection device configured for use by a dog, the device consisting of:
   a flexible outer pouch comprising a top open end and a bottom closed end;

a flexible inner pouch located within the outer pouch, the inner pouch comprising a top open end and a bottom end comprising a one-way valve for decreasing leaks and backflow of urine, the top end of the inner pouch and the top end of the outer pouch being sealed together to define a rim configured to fit over a penis or vulva of the dog; and two elongated bands, each elongated band having one end attached to the top end of the outer pouch and the top end of the inner pouch of the device and an opposite free end, the elongated bands configured to secure the device to the dog.

2. The disposable urine collection device of claim 1, wherein the elongated bands are made of a self-adhesive bandage material.

3. The disposable urine collection device of claim 1, wherein the elongated bands are configured to be tied around a lower back of the dog to secure the device over the penis or the vulva of the dog.

4. The disposable urine collection device of claim 1, wherein the elongated bands are integrally formed with the rim.

5. The disposable urine collection device of claim 1, wherein the inner and outer pouches are made of a transparent material.

6. A disposable urine collection device configured for use on a dog, the device consisting of:
   a flexible outer pouch comprising a top open end and a bottom closed end;
   a flexible inner pouch located within the outer pouch, the inner pouch comprising a top open end and a bottom end comprising a one-way valve for decreasing leaks and backflow of urine, the top end of the inner pouch and the top end of the outer pouch being sealed together to define a rim configured to fit over genitalia of the dog; and
   four elongated bands, each elongated band having one end attached to the top end of the outer pouch and the top end of the inner pouch of the device and an opposite free end, the elongated bands configured to secure the device to the dog.

7. The disposable urine collection device of claim 6, wherein the elongated bands are made of a self-adhesive bandage material.

8. The disposable urine collection device of claim 6, wherein the elongated bands are configured to be tied together to secure the device over the genitalia of the dog.

9. The disposable urine collection device of claim 6, wherein the elongated bands are integrally formed with the rim.

10. A disposable urine collection device configured for use by a dog, the device consisting of:
    a double-wall pouch including:
       a flexible outer pouch comprising a top open end and a bottom closed end; and
       a flexible inner pouch located within the outer pouch, the inner pouch comprising a top open end and a bottom end comprising a one-way valve for decreasing leaks and backflow of urine, the top end of the inner pouch and the top end of the outer pouch being sealed together to define a rim configured to fit over a penis or vulva of the dog;
    a plurality of elongated bands, each elongated band having one end attached to the double-wall pouch and an opposite free end, the elongated bands configured to secure the double-wall pouch to the dog; and
    a non-toxic, unpleasant tasting substance coated on the double-wall pouch and the plurality of elongated bands to deter chewing by the dog.

11. The disposable urine collection device of claim 10, wherein the elongated bands are made of a self-adhesive bandage material.

12. The disposable urine collection device of claim 10, wherein the elongated bands are configured to be tied around the dog to secure the double-wall pouch over the penis or the vulva of the dog.

13. The disposable urine collection device of claim 10, wherein the elongated bands are integrally formed with the rim.

14. The disposable urine collection device of claim 10, wherein the inner and outer pouches are made of a transparent material.

* * * * *